(12) United States Patent
Sanada et al.

(10) Patent No.: US 8,771,383 B2
(45) Date of Patent: Jul. 8, 2014

(54) BATTERY MANUFACTURING METHOD, BATTERY MANUFACTURED BY SUCH METHOD, VEHICLE AND ELECTRONIC DEVICE

(75) Inventors: Masakazu Sanada, Kyoto (JP); Takeshi Matsuda, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 13/155,020

(22) Filed: Jun. 7, 2011

(65) Prior Publication Data

US 2012/0002359 A1    Jan. 5, 2012

(30) Foreign Application Priority Data

Jul. 1, 2010   (JP) .................. 2010-150737

(51) Int. Cl.
*H01M 6/18* (2006.01)
*H01M 6/40* (2006.01)

(52) U.S. Cl.
CPC ............ *H01M 6/188* (2013.01); *H01M 6/40* (2013.01)
USPC ........................... 29/623.1; 29/623.5

(58) Field of Classification Search
CPC ................... H01M 6/188; H01M 6/40
USPC .............................. 29/623.1, 623.5
See application file for complete search history.

(56) References Cited

U.S. PATENT DOCUMENTS

| | | | | |
|---|---|---|---|---|
| 5,585,039 | A * | 12/1996 | Matsumoto et al. | 252/500 |
| 2002/0036131 | A1 * | 3/2002 | Kugai et al. | 204/192.1 |
| 2010/0104947 | A1 * | 4/2010 | Choi et al. | 429/304 |
| 2011/0070479 | A1 | 3/2011 | Matsuda et al. | 429/162 |

FOREIGN PATENT DOCUMENTS

| | | |
|---|---|---|
| JP | 05-109429 | 4/1993 |
| JP | 05-299119 | 11/1993 |
| JP | 2002-042883 | 2/2002 |
| JP | 2005-116248 | 4/2005 |
| JP | 2008-010253 | 1/2008 |
| JP | 2010-106276 | 5/2010 |
| KR | 10-2010-0047791 | 5/2010 |
| KR | 10-20110033054 A | 3/2011 |

OTHER PUBLICATIONS

JP 2005116248 A machine English translation Apr. 2005.*
Notice of Allowance issued Sep. 27, 2013 for the corresponding to the Korean Patent Application No. 10-2011-0055086 (2 pages).

* cited by examiner

*Primary Examiner* — Ula C Ruddock
*Assistant Examiner* — Scott J Chmielecki
(74) *Attorney, Agent, or Firm* — Ostrolenk Faber LLP (57) ABSTRACT

A negative-electrode active material layer having a line-and-space structure is formed by applying an application liquid containing a negative-electrode active material in stripes on a surface of a negative-electrode current collector using a nozzle-scan coating method and drying the application liquid (Steps S101, S102). Subsequently, by a spin coating method, an application liquid containing a solid electrolyte material is applied (Step S103) and heated at a temperature lower than a glass-transition temperature of the electrolyte material to be dried. Further, an application liquid containing a positive-electrode active material is applied (Step S105) and a positive-electrode current collector is laminated (Step S106) and, then, a laminated body is heated to or above the glass-transition temperature of the electrolyte material to cause the solid electrolyte to flow and adhere to the active material layers.

3 Claims, 10 Drawing Sheets

BATTERY MANUFACTURING METHOD, BATTERY MANUFACTURED BY SUCH METHOD, VEHICLE AND ELECTRONIC DEVICE

CROSS REFERENCE TO RELATED APPLICATION

The disclosure of Japanese Patent Application No. 2010-150737 filed on Jul. 1, 2010 including specification, drawings and claims is incorporated herein by reference in its entirety.

BACKGROUND OF THE INVENTION

1. Field of the Invention

This invention relates to a method for manufacturing a battery in which a solid electrolyte layer is interposed between active material layers, a battery manufactured by this method, and a vehicle and an electronic device including this battery.

2. Description of the Related Art

Conventionally, as a method for producing a chemical battery such as a lithium-ion secondary battery, a technology for laminating metal foils as current collectors having respectively positive-electrode or negative-electrode active materials attached thereto with a separator disposed therebetween and impregnating the separator with an electrolytic solution has been known. However, a battery including a highly volatile organic solvent as an electrolytic solution needs to be carefully handled. Further, for required further miniaturization and higher output, a technology for producing an all-solid-state battery by microfabrication using a solid electrolyte in place of an electrolytic solution has been and is being proposed in recent years.

For example, JP2005-116248A (hereinafter, referred to as "patent literature 1") discloses a technology for forming an active material layer having an uneven surface on a metal foil, which will become a current collector, by an ink-jet method and successively three-dimensionally laminating a solid electrolyte layer and another active material layer by the ink-jet method so as to flatten the unevenness. In this technology, the above space structure is obtained by laminating a multitude of layers mixedly including different functional layers such as the positive and negative active material layers and the solid electrolyte layer formed by one printing process by recoating. At this time, every time one layer is applied, a drying treatment is performed to volatilize a solvent contained in ink.

To obtain good electrochemical properties in a battery in which an electrolyte layer is interposed between positive and negative active material layers, it is important that the active material layers and the electrolyte layer closely contact with each other at interfaces between them. In the case of a liquid electrolyte, the electrolyte penetrates into recessed portions of fine unevenness on active material layer surfaces. However, particularly in the case of a solid electrolyte, the active material layers and the electrolyte layer need to closely contact with each other at the interfaces between them. However, no consideration is made on this in the above prior art and there has been room for improvement in obtaining a battery having good electrochemical properties.

SUMMARY OF THE INVENTION

In view of the above problems, an object of this invention is to provide a battery which uses a solid electrolyte and has a small size and excellent electrochemical properties and a device including this battery.

To achieve the above object, a battery manufacturing method of the present invention comprises: a first active material layer forming step of forming a first active material layer on a surface of a base material by applying a first application liquid containing a first active material on the surface of the base material, the first active material layer having unevenness on a surface opposite to a surface in contact with the base material; an electrolyte layer forming step of forming a solid electrolyte layer by applying a second application liquid containing a solid electrolyte material on the surface of the first active material layer and increasing viscosity of the second application liquid, the electrolyte layer having unevenness in conformity with unevenness of the first active material layer on a surface opposite to a surface in contact with the first active material layer; a second active material layer forming step of forming a second active material layer by applying a third application liquid containing a second active material on the surface of the solid electrolyte layer; and a heating step of heating the solid electrolyte layer to reduce the viscosity of the solid electrolyte layer after the second active material layer forming step.

The battery manufactured by this invention is so structured that the first and second active material layers face each other via the solid electrolyte layer having the unevenness in conformity with that on the surface of the first active material layer. Such a battery has good charge and discharge characteristics since facing areas of the first and second active material layers are large with respect to the volume of the used active materials. The second active material layer is formed after the solid electrolyte layer is formed by applying the second application liquid containing the electrolyte material and increasing the viscosity of the second application liquid and, thereafter, the viscosity is reduced by heating the solid electrolyte layer. Thus, contact of the respective materials is good at interfaces between the first active material layer and the solid electrolyte layer and between the second active material layer and the solid electrolyte layer. This further improves battery performances. Thus, according to the invention, it is possible to manufacture a battery which uses a solid electrolyte and has a small size and excellent electrochemical properties.

In this invention, the flow of the second application liquid applied to projected portions of the surface of the first active material layer to surrounding recessed portions can be suppressed and the solid electrolyte layer in conformity with the unevenness on the first active material layer can be formed by increasing the viscosity of the second application liquid after application thereof. By heating the solid electrolyte material after the formation of the second active material layer, the viscosity of the solid electrolyte layer, which was once increased, is reduced again. At this time, the solid electrolyte layer is already sandwiched between the first and second active material layers, wherefore the electrolyte material does not flow out.

To achieve the above object, a battery according to the present invention has a structure in which a first current collector layer, a first active material layer, a solid electrolyte layer, a second active material layer and a second current collector layer are laminated in this order, and is characterized in that the first active material layer, the solid electrolyte layer and the second active material layer are formed using the first current collector layer as the base material by the manufacturing method according to the above battery manufacturing method.

In the invention thus constructed, the first and second active material layers face each other via the solid electrolyte layer having the unevenness in conformity with that on the surface of the first active material layer. Further, as described above, the contact of the respective materials is good at the interfaces between the first active material layer and the solid electrolyte layer and between the second active material layer and the solid electrolyte layer. Therefore, the battery according to the invention is a battery using a solid electrolyte and having excellent electrochemical properties.

There are various fields of application for the battery having the above structure. For example, the battery can be applied as a power supply for various vehicles such as electric vehicles and can be applied to various electronic devices including a circuit unit which operates using this battery as a power supply.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1A:
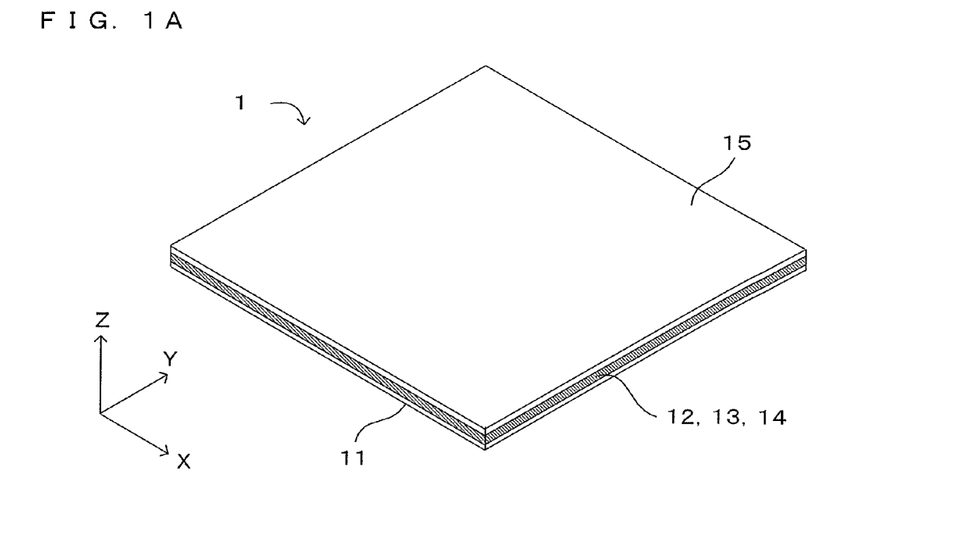
FIG. 1A is a perspective view of a lithium-ion secondary battery as one embodiment of a battery according to the invention.
Figure 1B:
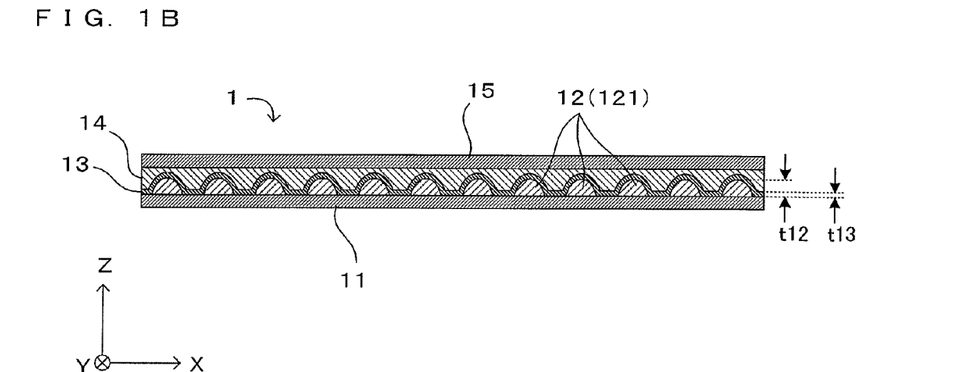
FIG. 1B is a drawing which shows a cross-sectional structure of this battery.

FIG. 1A is a perspective view of a lithium-ion secondary battery as one embodiment of a battery according to the invention. FIG. 1B is a drawing which shows a cross-sectional structure of this battery. This lithium-ion secondary battery module 1 has such a structure that a negative-electrode active material layer 12, a solid electrolyte layer 13, a positive-electrode active material layer 14 and a positive-electrode current collector 15 are successively laminated on a surface of a negative-electrode current collector 11. In this specification, X-, Y- and Z-coordinate directions are respectively defined as shown in FIG. 1A.

As shown in FIG. 1B, the negative-electrode active material layer 12 has a line-and-space structure in which a multitude of stripe-shaped pattern elements 121 formed by a negative-electrode active material and extending in a Y-direction are arranged at regular intervals in an X-direction. On the other hand, the solid electrolyte layer 13 is a continuous thin film with a substantially constant thickness formed by a solid electrolyte. The solid electrolyte layer 13 uniformly covers the substantially entire upper surface of a laminated body in such a manner as to conform to (follow) the unevenness on the surface of the laminated body in which the negative-electrode active material layer 12 is formed on the negative-electrode current collector 11 as described above.

The lower surface of the positive-electrode active material layer 14 has an uneven structure in conformity with the unevenness on the upper surface of the solid electrolyte layer 13, whereas the upper surface thereof is a substantially flat surface. The positive-electrode current collector 15 is laminated on the upper surface of the positive-electrode active material layer 14 formed to be substantially flat in this way, whereby the lithium-ion secondary battery module 1 is formed. A lithium-ion secondary battery is formed by appropriately arranging tab electrodes or laminating a plurality of modules on this lithium-ion secondary battery module 1.

Here, known materials for lithium-ion batteries can be used as materials for the respective layers. For example, a copper foil and an aluminum foil can be respectively used as the negative-electrode current collector 11 and the positive-electrode current collector 15. Further, a material mainly containing $LiCoO_2$ (LCO) can be, for example, used as a positive-electrode active material and a material mainly containing $Li_4Ti_5O_{12}$ (LTO) can be, for example, used as a negative-electrode active material. Furthermore, polyethylene oxide and polystyrene can be, for example, used as the solid electrolyte layer 13. Note that the materials for the respective functional layers are not limited to these.

The lithium-ion secondary battery module 1 having such a structure is thin and flexible. Since the negative-electrode active material layer 12 is formed to have an uneven space structure as shown and, thereby, increase its surface area with respect to its volume, an area facing the positive-electrode active material layer 14 via the thin solid electrolyte layer 13 can be increased to ensure high efficiency and high output. In this way, the lithium-ion secondary battery having the above structure can be small in size and have high performance.

Next, a method for manufacturing the above lithium-ion secondary battery module 1 is described. Conventionally, a module of this type has been formed by laminating thin film materials corresponding to respective functional layers, but there is a limit in increasing the density of the module by this manufacturing method. Further, with the manufacturing method disclosed in patent literature 1 described above, production takes time due to many operation steps and it is difficult to separate the respective functional layers. In contrast, with the manufacturing method described below, the lithium-ion secondary battery module 1 having the above structure can be produced with a smaller number of operation steps using an existing processing apparatus.

Figure 2:
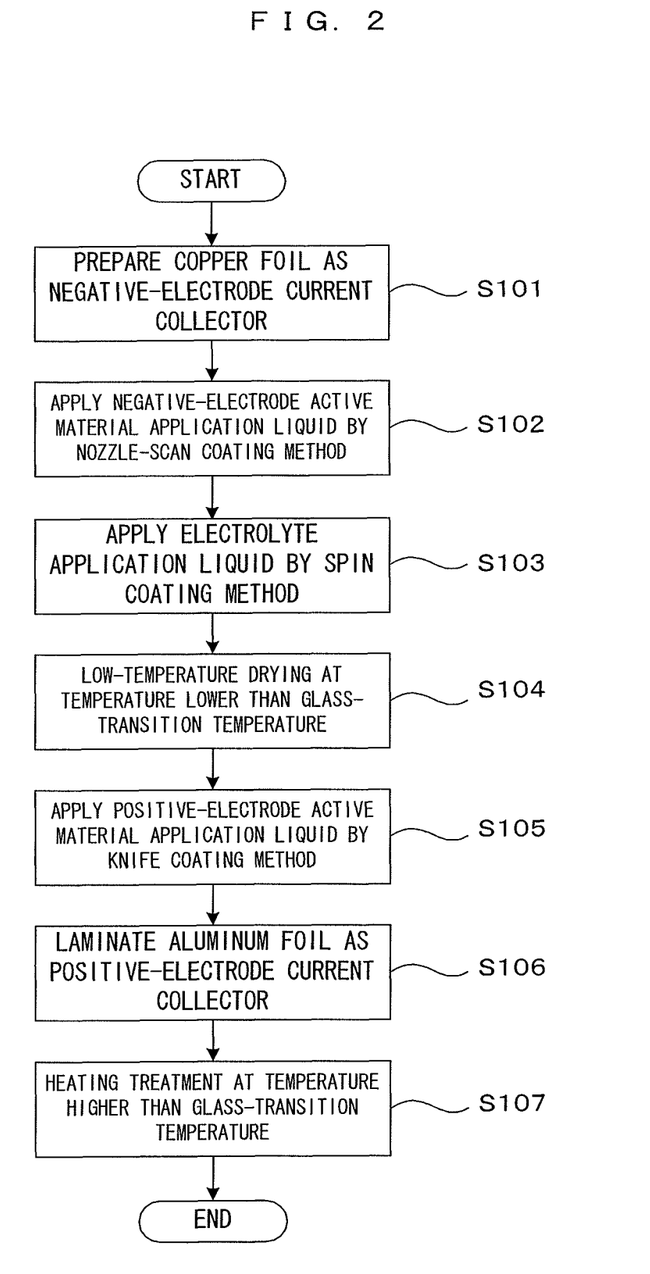
FIG. 2 is a flow chart which shows an example of a method for manufacturing the battery of FIG. 1A.

FIG. 2 is a flow chart which shows an example of a method for manufacturing the battery of FIG. 1A. In this manufacturing method, a metal foil, e.g. a copper foil, which will become the negative-electrode current collector 11, is first prepared (Step S101). In the case of using a thin copper foil, it is difficult to transport and handle this foil. Accordingly, it is preferable to improve transportability, for example, by attaching one surface of the copper foil to a carrier such as a glass plate or a resin sheet.

Subsequently, a negative-electrode active material application liquid containing a negative-electrode active material is applied to one surface of the copper foil by a nozzle dispensing method, in particular, by a nozzle-scan coating method for relatively moving a nozzle for dispensing the application liquid with respect to an application target surface (Step S102). An organic LTO material containing the negative-electrode active material described above can be, for example, used as the application liquid. A mixture of the above negative-electrode active material, acetylene black or ketjen black as a conduction aid, polyvinylidene fluoride (PVDF), styrene butadiene rubber (SBR), polyvinyl pyrrolidone (PVP), polyvinyl alcohol (PVA) or polytetrafluoroethylene (PTFE) as a binder, N-methyl-2-pyrrolidone (NMP) as a solvent and the like can be used as the application liquid. Note that, besides LTO described above, graphite, metal lithium, $SnO_2$, alloys and the like can be used as the negative-electrode active material.

Figure 3A:
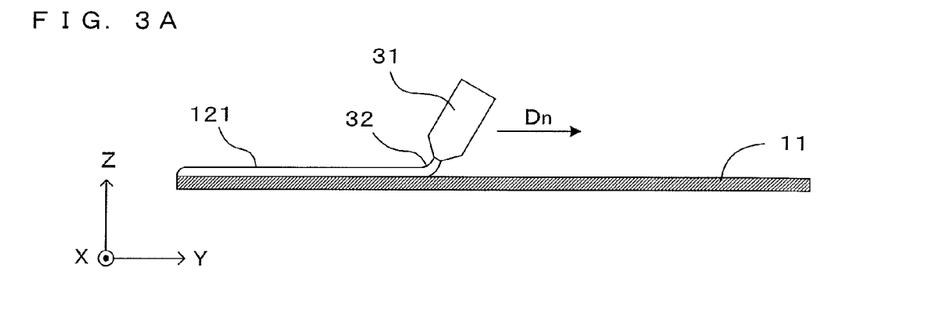
FIG. 3A is a drawing which shows a state of application by the nozzle-scan coating method when viewed in the X-direction.
Figure 3B:
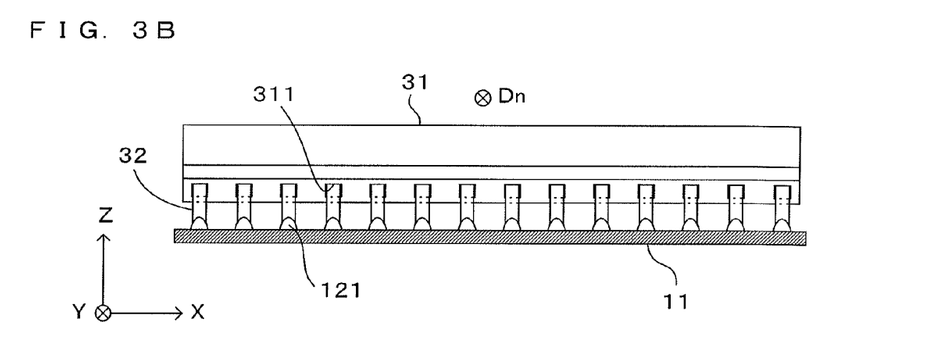
FIGS. 3B and 3C are drawings showing the same state when viewed in the Y-direction and from a diagonal upper side.
Figure 3C:
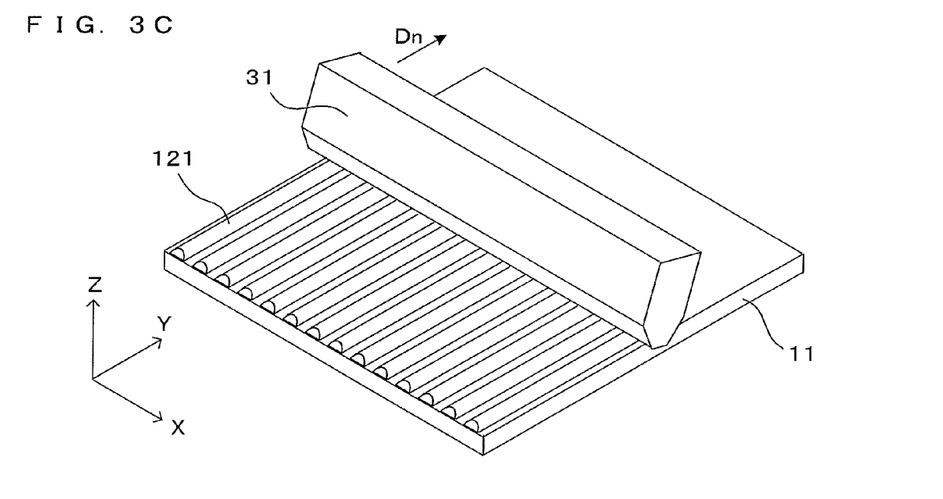

FIG. 3A is a drawing which shows a state of application by the nozzle-scan coating method when viewed in the X-direction, and FIGS. 3B and 3C are drawings showing the same state when viewed in the Y-direction and from a diagonal upper side. A technology for applying an application liquid to a base material by the nozzle-scan coating method is known and such a known technology can be applied also in this method, wherefore an apparatus construction is not described.

In the nozzle-scan coating method, a nozzle 31 perforated with one or more dispense openings 311 for dispensing the above organic LTO material as the application liquid is arranged above a copper foil 11. The nozzle 31 is relatively moved at a constant speed in an arrow direction Dn with respect to the copper foil 11 while dispensing a fixed amount of an application liquid 32 from the dispense opening(s) 311. By doing so, the application liquid 32 is applied on the copper foil 11 in a stripe extending in the Y-direction. By providing the nozzle 31 with a plurality of dispense openings 311, a plurality of stripes can be formed by one movement. By repeating this movement according to need, the application liquid can be applied in stripes on the entire surface of the copper foil 11. By drying and curing the application liquid, the stripe-shaped pattern elements 121 by the negative-electrode active material are formed on the upper surface of the copper foil 11. Heating may be applied after application to promote drying or a photo-curable resin may be added to the application liquid and the application liquid may be cured by light irradiation after application.

At this point of time, an active material layer 12 is partly raised on the substantially flat surface of the copper foil 11. Thus, as compared with the case where the application liquid is simply applied to have a flat upper surface, a surface area can be increased with respect to the used amount of the active material. Therefore, the area facing a positive-electrode active material layer to be formed later can be increased to ensure a high output.

The flow chart of FIG. 2 is further described. An electrolyte application liquid is applied on the upper surface of a laminated body, which is formed by laminating the negative-electrode active material layer 12 on the copper foil 11, by an appropriate coating method, e.g. a spin coating method (Step S103). As the electrolyte application liquid, a mixture of a resin such as the above polymer electrolyte material such as polyethylene oxide and polystyrene, a supporting salt such as $LiPF_6$ (lithium hexafluorophosphate) and a solvent such as diethylene carbonate can be used.

Figure 4:
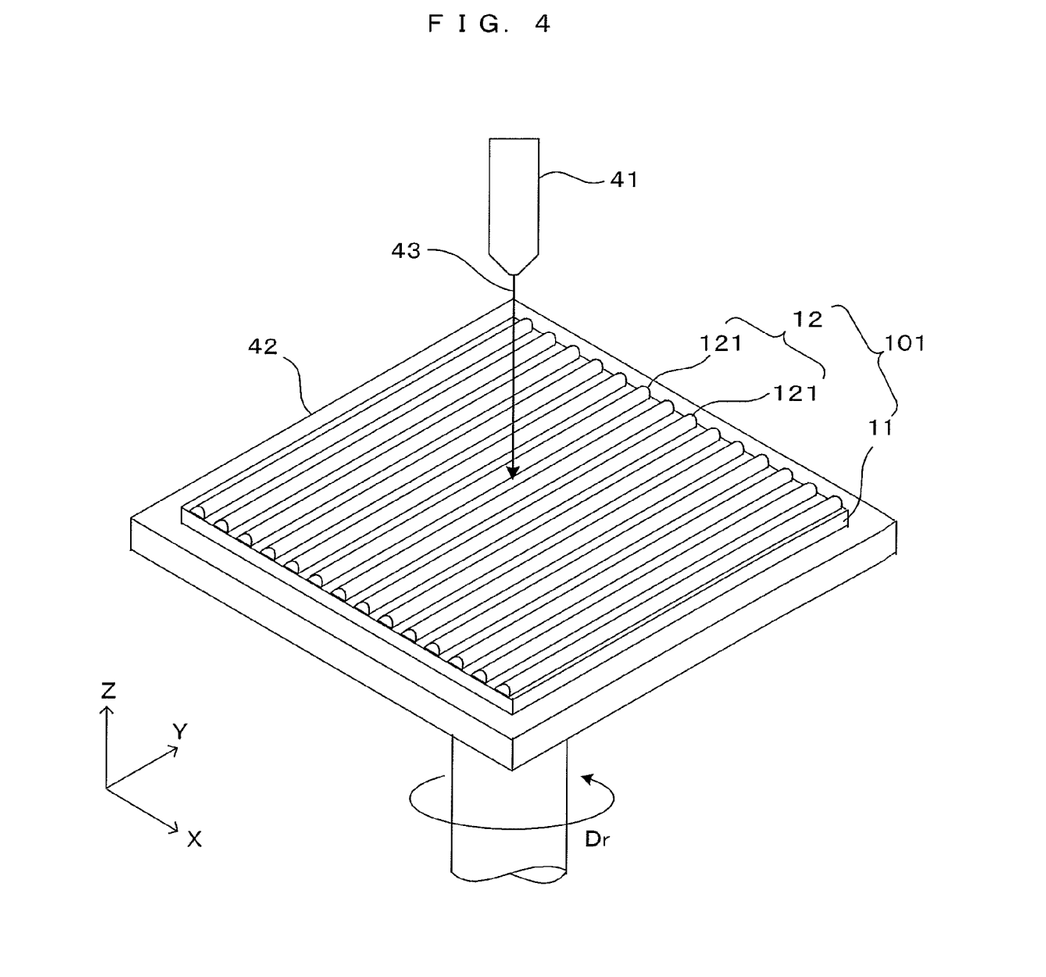
FIG. 4 is a drawing which diagrammatically shows a state of material application by the spin coating method.

FIG. 4 is a drawing which diagrammatically shows a state of material application by the spin coating method. The laminated body 101 formed by laminating the negative-electrode active material layer 12 made of the stripe-shaped pattern elements 121 on the copper foil 11 is substantially horizontally placed on a rotary stage 42 rotatable in a specified rotational direction Dr about a rotary shaft extending in a vertical direction (Z-direction). Then, the rotary stage 42 is rotated at a specified rotational speed and an application liquid 43 containing a polymer electrolyte material is dispensed toward the laminated body 101 from a nozzle 41 disposed at a position above the rotary shaft of the rotary stage 42. The application liquid dropped onto the laminated body 101 spreads around by a centrifugal force, whereby the excess liquid is shaken off from an end portion of the laminated body 101. By doing so, the upper surface of the laminated body 101 is covered by a thin and uniform layer of the application liquid. In the spin coating method, film thickness can be controlled according to the viscosity of the application liquid and the rotational speed of the rotary stage 42. There is a good track record in forming a thin film with a uniform thickness on an object to be processed having an uneven surface structure such as the laminated body 101 of this application in conformity with the unevenness.

The thickness of the solid electrolyte layer 13 is arbitrarily set, but needs to be such that the positive and negative active material layers are reliably separated and internal resistance is equal to or below a permissible value. This thickness may be, for example, 20 µm to 50 µm. In order not to eliminate the significance of the unevenness on the negative-electrode active material layer 12 provided to increase the surface area, the thickness (t13 in FIG. 1B) of the solid electrolyte layer 13 is desirably smaller than a height difference (t12 in FIG. 1B) of the unevenness on the negative-electrode active material layer 12. The height difference can be defined as a height of the projection of the negative-electrode active material layer 12 from a flat portion of the laminated body 101, for instance. In the example of FIG. 1B, the height t12 of the stripe-shaped element 121 from the flat surface of the negative-electrode current collector 11 corresponds to the "height difference" of the unevenness on the negative-electrode active material layer 12.

Referring back to FIG. 2, the flow chart is further described. By heating the electrolyte application liquid containing the polymer electrolyte material and applied to the laminated body 101 in this way, a solvent contained in the application liquid is volatilized to obtain the dried solid electrolyte layer 13. A heating temperature at this time is a relatively low temperature, more specifically a temperature lower than a glass-transition temperature of this polymer electrolyte material (Step S104). For an application liquid containing a mixture of a plurality of types of polymer electrolyte materials, a heating temperature is desirably set at a temperature lower than the lowest one of glass-transition temperatures of these materials. A drying treatment is performed at such a relatively low temperature for the following reason.

Figure 5A:
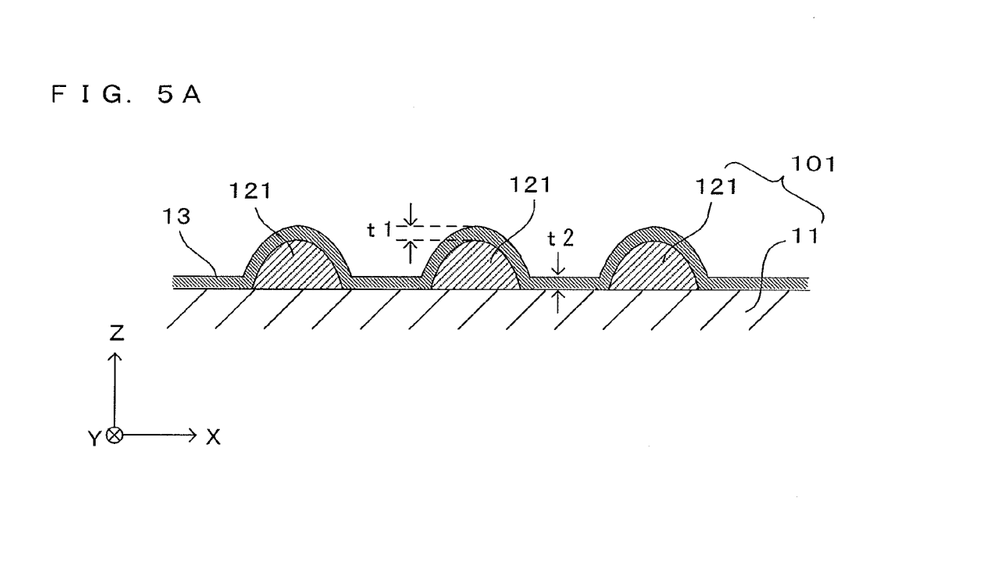
FIGS. 5A and 5B are drawings which show exemplary cross-sectional shapes of the solid electrolyte layer.
Figure 5B:
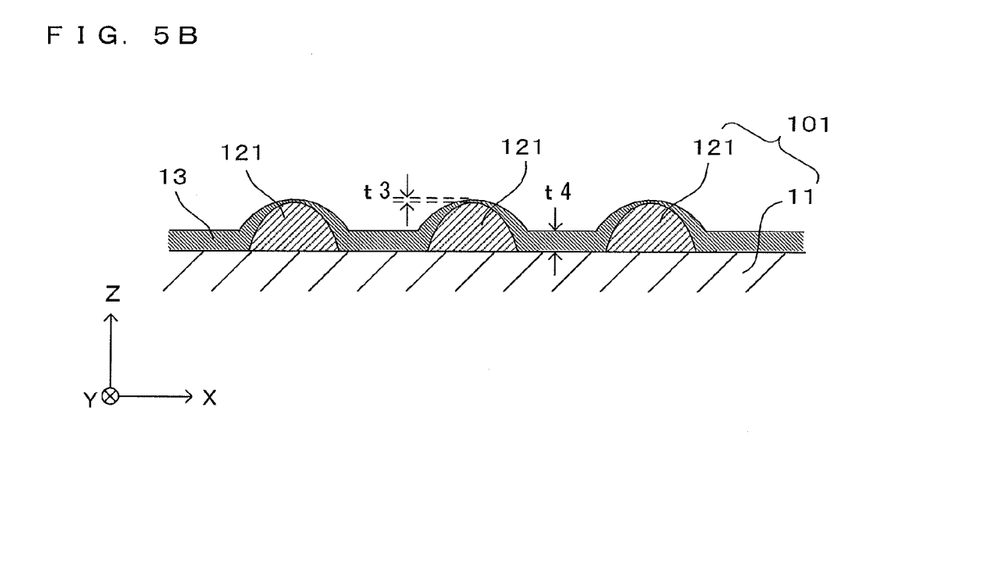

FIGS. 5A and 5B are drawings which show exemplary cross-sectional shapes of the solid electrolyte layer. The solid electrolyte layer 13 with a uniform thickness is desirably formed on the laminated body 101 having the uneven surface by the stripe-shaped pattern elements 121 formed by the negative-electrode active material on the negative-electrode current collector 11 to cover the surface of the laminated body 101. In other words, as shown in FIG. 5A, a thickness t1 of the solid electrolyte layer 13 on tops of the stripe-shaped pattern elements 121 is desirably substantially equal to a thickness t2 of the solid electrolyte layer 13 on the surface of the negative-electrode current collector 11 exposed without the negative-electrode active material being applied.

However, since the electrolyte application liquid is applied to the uneven surface, the electrolyte application liquid applied to the tops of the stripe-shaped pattern elements 121 flows down toward bottoms between the patterns before drying. Thus, as shown in FIG. 5B, a thickness t3 on the tops of the stripe-shaped pattern elements 121 becomes small and, on the contrary, a thickness t4 on the surface of the negative-electrode current collector 11 between the patterns becomes large. Since the solid electrolyte layer 13 has a lower ion diffusion velocity than an electrolytic solution, it is necessary to form a thin and uniform film to improve charge and discharge characteristics. An electrolyte layer having a nonuniform thickness and partly thick as shown in FIG. 5B reduces battery performances. Further, in a worse case, the tops of the stripe-shaped pattern elements 121 may be exposed. If this occurs, positive and negative electrodes are short-circuited and the battery does not normally function.

To prevent such a problem, it is necessary to quickly increase the viscosity of the electrolyte application liquid after application lest the application liquid should flow. To this end, it is useful to heat the electrolyte application liquid immediately after application. However, as also described later, particularly noncrystalline polymer materials have a property of suddenly increasing fluidity when being heated to or above a glass-transition temperature specific to the material. Thus, if the application liquid is heated to or above the glass-transition temperature of the material, fluidity increases rather than decreases and the material flows to the surrounding from the tops of the stripe-shaped pattern elements 121.

Accordingly, at this point of time, the application liquid is heated to suppress the flow from the tops of the stripe-shaped pattern elements 121 by volatilizing the solvent and increasing the viscosity of the electrolyte application liquid in a short time. However, this heating temperature is kept to be lower than the glass-transition temperature of the electrolyte material. By doing so, it becomes possible to form the thin and uniform polymer electrolyte layer 13. Note that this problem is specific to a process for forming unevenness on a surface of an active material layer as in this embodiment and does not occur when the surface of the active material layer is formed to be substantially flat.

The flow chart of FIG. 2 is further described. The positive-electrode active material layer 14 is formed on a laminated body formed by laminating the copper foil 11, the negative-electrode active material layer 12 and the solid electrolyte layer 13 in this way (Step S105). The positive-electrode active material layer 14 is formed by applying a positive-electrode active material application liquid containing a positive-electrode active material by an appropriate coating method, e.g. a known knife coating method. An aqueous LCO material obtained by mixing the positive-electrode active material, acetylene black as a conduction aid, SBR as a binder, carboxymethylcellulose (CMC) as a dispersant and pure water as a solvent can be, for example, used as the application liquid containing the positive-electrode active material. Besides the above LCO, $LiNiO_2$, $LiFePO_4$, $LiMnPO_4$, $LiMn_2O_4$ or compounds represented by $LiMeO_2$ (Me=$M_xM_yM_z$; Me, M are transition metal elements and x+y+z=1) such as $LiNi_{1/3}Mn_{1/3}Co_{1/3}O_2$ and $LiNi_{0.8}Co_{0.15}Al_{0.05}O_2$ can be used as the positive-electrode active material. Further, besides the knife coating method illustrated below, known coating methods capable of forming a flat film on a flat surface such as a bar coating method and a spin coating method can be appropriately employed as the coating method.

Figure 6:
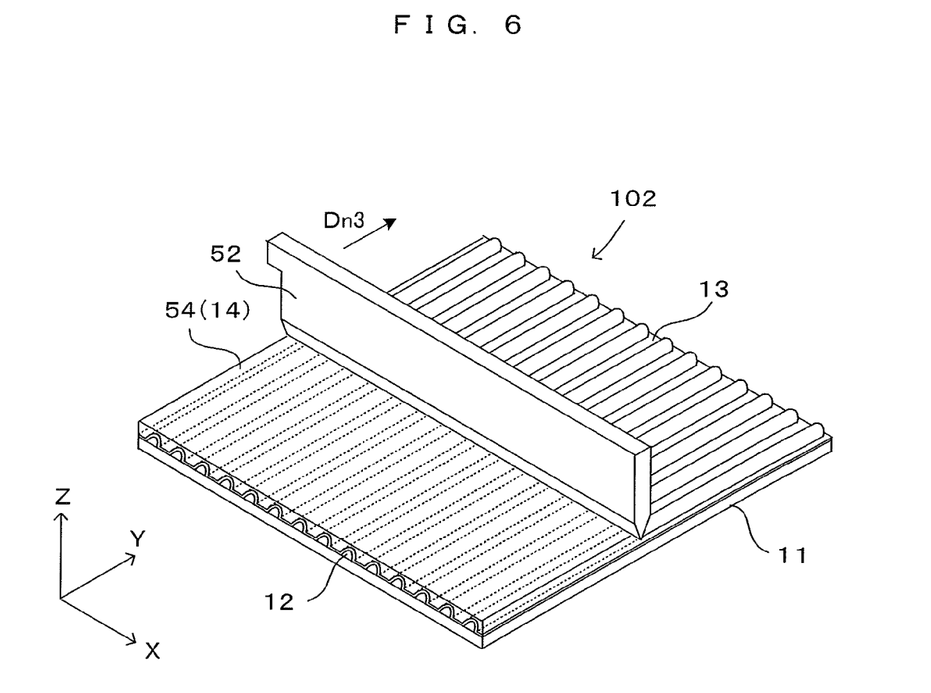
FIG. 6 is a drawing which diagrammatically shows a state of applying the positive-electrode active material by the knife coating method.

FIG. 6 is a drawing which diagrammatically shows a state of applying the positive-electrode active material by the knife coating method. The application liquid containing the positive-electrode active material is discharged to the upper surface of a laminated body 102 from an unillustrated nozzle. A blade 52 arranged in proximity to the upper surface of the laminated body 102 moves in a direction of arrow Dn3 along the upper surface of the laminated body 102 while the bottom end thereof touches the application liquid. In this way, the upper surface of an application liquid 54 is leveled.

By applying the application liquid 54 containing the positive-electrode active material on the laminated body 102 while leveling it in this way, the positive-electrode active material layer 14 is formed on the laminated body 102 formed by laminating the negative-electrode current collector 11, the negative-electrode active material layer 12 and the solid electrolyte layer 13. The positive-electrode active material layer 14 has the uneven lower surface in conformity with the unevenness on the solid electrolyte layer 13, whereas the upper surface thereof is substantially flat. It is appropriate to set the thickness of the positive-electrode active material layer 14 at 20 μm to 100 μm.

Referring back to FIG. 2, the flow chart is further described. A metal foil, e.g. an aluminum foil which will become a positive-electrode current collector 15 is laminated on the upper surface of the positive-electrode active material layer 14 formed in this way (Step S106). At this time, it is desirable to superimpose the positive-electrode current collector 15 on the upper surface of the positive-electrode active material layer 14 formed in previous Step S105 before the positive-electrode active material layer 14 is cured. By doing so, the positive-electrode active material layer 14 and the positive-electrode current collector 15 can be tightly bonded to each other. Since the upper surface of the positive-electrode active material 14 is leveled, the positive-electrode current collector 15 can be easily laminated without forming any clearance.

Subsequently, a heating treatment is performed on the laminated body formed by laminating the negative-electrode current collector 11, the negative-electrode active material layer 12, the solid electrolyte layer 13, the positive-electrode active material layer 14 and the positive-electrode current collector 15. A heating temperature at this time is equal to or higher than the glass-transition temperature of the polymer electrolyte material constituting the solid electrolyte layer 13 (Step S107). The reason for this is described below.

Figure 7A:
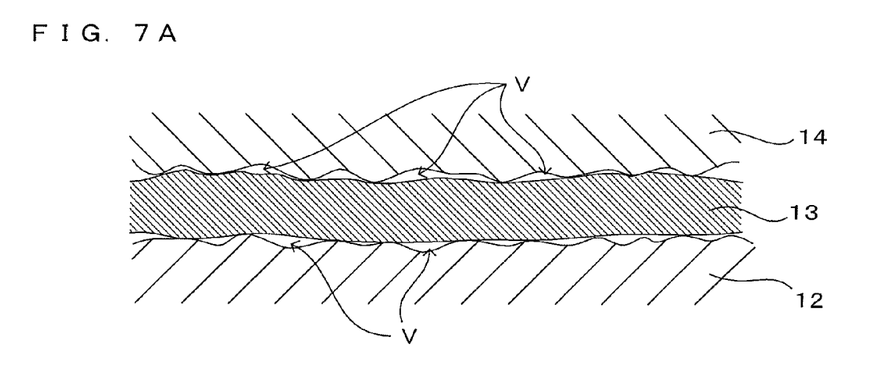
FIGS. 7A and 7B are drawings which diagrammatically show a state of interfaces between the positive and negative-electrode active materials and the solid electrolyte.
Figure 7B:
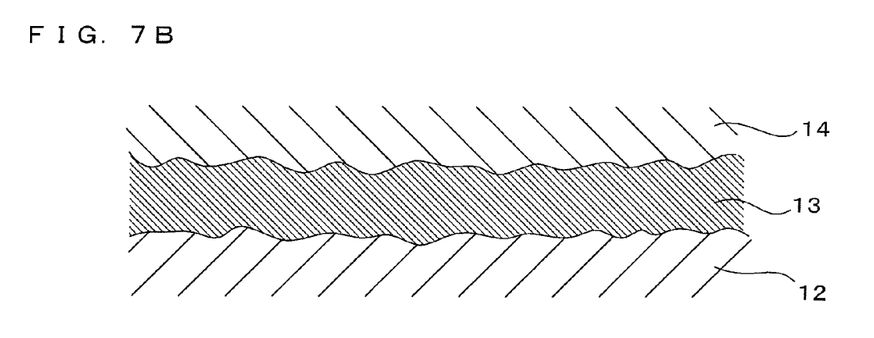

FIGS. 7A and 7B are drawings which diagrammatically show a state of interfaces between the positive and negative-electrode active materials and the solid electrolyte. FIG. 7A shows a state before the heating treatment. Fine unevenness is inevitably formed on the surfaces of the negative-electrode active material layer 12, the solid electrolyte layer 13 and the positive-electrode active material layer 14 formed by application. Thus, in a state where these respective layers are simply laminated one on another, many minute clearances V are present between the negative-electrode active material layer 12 and the solid electrolyte layer 13 and between the solid electrolyte layer 13 and the positive-electrode active material layer 14 as shown in FIG. 7A. Thus, substantially facing areas of the positive-electrode active material layer and the negative-electrode active material layer via the electrolyte layer are not increased very much.

FIG. 7B shows a state after the heating treatment. When the polymer electrolyte material is heated to the vicinity of the glass-transition temperature, the viscosity of the cured solid electrolyte layer 13 gradually decreases due to thermoplasticity and, particularly, at a temperature equal to or higher than the glass-transition temperature, the viscosity largely decreases to increase fluidity. Thus, as shown in FIG. 7B, the electrolyte penetrates into recessed portions of the unevenness on the surfaces of the positive-electrode active material layer 14 and the negative-electrode active material layer 12 and the materials fit each other at the interfaces between the active materials and the electrolyte to fill up the clearances. Since the flowable range of the solid electrolyte layer 13 is limited to the narrow space between the positive and negative active material layers at this point of time, there is no likelihood that the electrolyte with increased fluidity flows out to the surrounding. Since the electrolyte material is kept at a temperature lower than the glass-transition temperature after the electrolyte application liquid is applied until it is sandwiched between the positive and negative active material layers, the electrolyte is not lost and the thin and uniform electrolyte layer can be formed.

Note that, for an application liquid including a mixture of a plurality of types of polymer electrolyte materials, the heating temperature is desirably set to be equal to or higher than the highest one of the glass-transition temperatures of these materials. By doing so, the electrolyte layer can be more reliably caused to flow and adhere to the positive and negative active material layers. Further, if the solid electrolyte is a polymer electrolyte, heating of the electrolyte layer also leads to an effect of increasing a degree of polymerization of polymer to form a stable thin film. Accordingly, it is possible to use not only polymer electrolytes with advanced polymerization, but also their precursors as the electrolyte material to be contained in the electrolyte application liquid.

By performing the heating treatment in this way, the facing areas of the positive and negative active materials via the electrode layer can be increased to improve battery performances. In this case, the laminated body may be pressurized in addition to being heated to further increase a degree of adhesion. In the above manner, the lithium-ion secondary battery module 1 shown in FIG. 1A can be manufactured.

As described above, in this embodiment, the negative-electrode active material layer 12 having the line-and-space structure is formed by applying the negative-electrode active material application liquid on the negative-electrode current collector 11 by the nozzle-scan coating method. By this, it is possible to form the negative-electrode active material layer 12 having a large surface area with respect to the volume of the material. According to the application using the nozzle-scan coating method, a considerably larger amount of application liquid can be continuously discharged as compared with the prior art ink jet method described above. Therefore, the negative-electrode active material layer 12 having an uneven pattern with a large height difference can be formed in a short time.

The substantially uniform solid electrolyte layer 13 having unevenness in conformity with that on the surface of the negative-electrode active material layer 12 is formed by applying the application liquid containing the polymer electrolyte material by the spin coating method. At this time, the application liquid is dried by heating the electrolyte application liquid after application. The heating temperature is lower than the glass-transition temperature of the electrolyte material to prevent the negative-electrode active material layer 12 from being exposed and the thickness of the electrolyte layer from becoming nonuniform due to the flow of the application liquid applied on the negative-electrode active material layer 12 to the surrounding. By doing so, the electrolyte layer with a uniform thickness can be formed by suppressing the flow of the electrolyte.

On the other hand, the electrolyte layer is heated again after being sandwiched between the positive and negative active material layers. At this time, the electrolyte layer is heated to a temperature equal to or higher than the glass-transition temperature of the electrolyte material. This improves adhesion of the materials at the interfaces between the electrolyte layer and the active material layers and further improves battery performances.

The lithium-ion secondary battery module 1 manufactured in this way is thin and good in electrochemical properties. A battery manufactured using this is an all-solid-state battery containing no organic solvent, is easily handled and has a small size and excellent performances. Such a battery can be used in machines such as electric vehicles, electrically assisted bicycles, electric tools and robots, mobile devices such as personal computers, mobiles phones, mobile music players, digital cameras and video camera, and various electronic devices such as smart IC cards, game machines, portable measurement devices, communication devices and toys.

Examples of devices mounted with the battery according to the invention are described below. However, these are only illustration of some forms of devices to which the battery of this embodiment is applicable and a range of application of the battery according to the invention is not limited to these.

Figure 8:
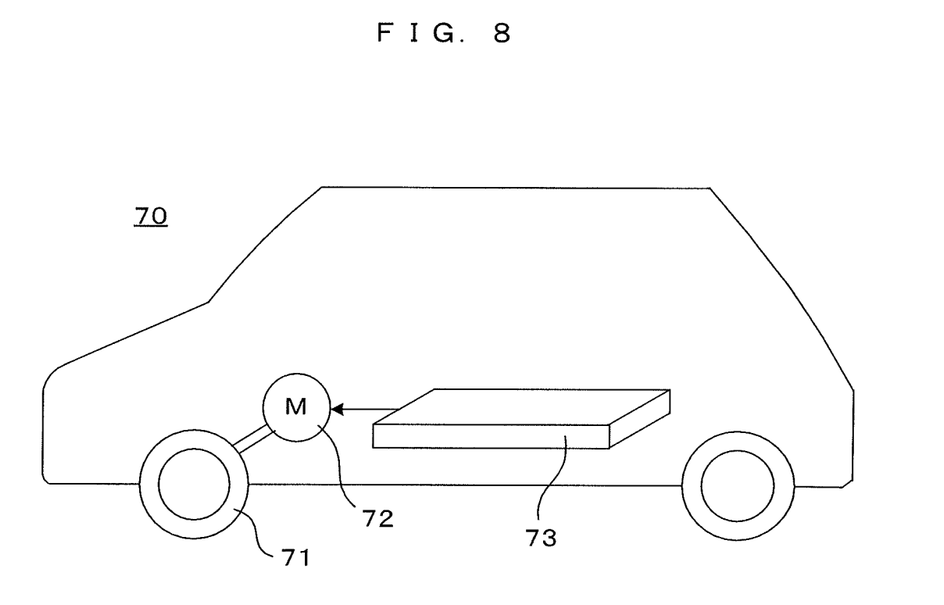
FIG. 8 is a drawing which diagrammatically shows a vehicle as an example of the device mounted with the battery according to the invention.

FIG. 8 is a drawing which diagrammatically shows a vehicle, specifically an electric vehicle as an example of the device mounted with the battery according to the invention. This electric vehicle 70 includes wheels 71, a motor 72 for driving the wheels 71, and a battery 73 for supplying power to the motor 72. A multitude of lithium-ion secondary battery modules 1 connected in series and/or parallel to each other can be employed as this battery 73. Since the thus constructed battery 73 is small in size, has a high power supply capability and is rechargeable in a short time, it is suitable as a power supply for driving a vehicle such as the electric vehicle 70.

Figure 9:
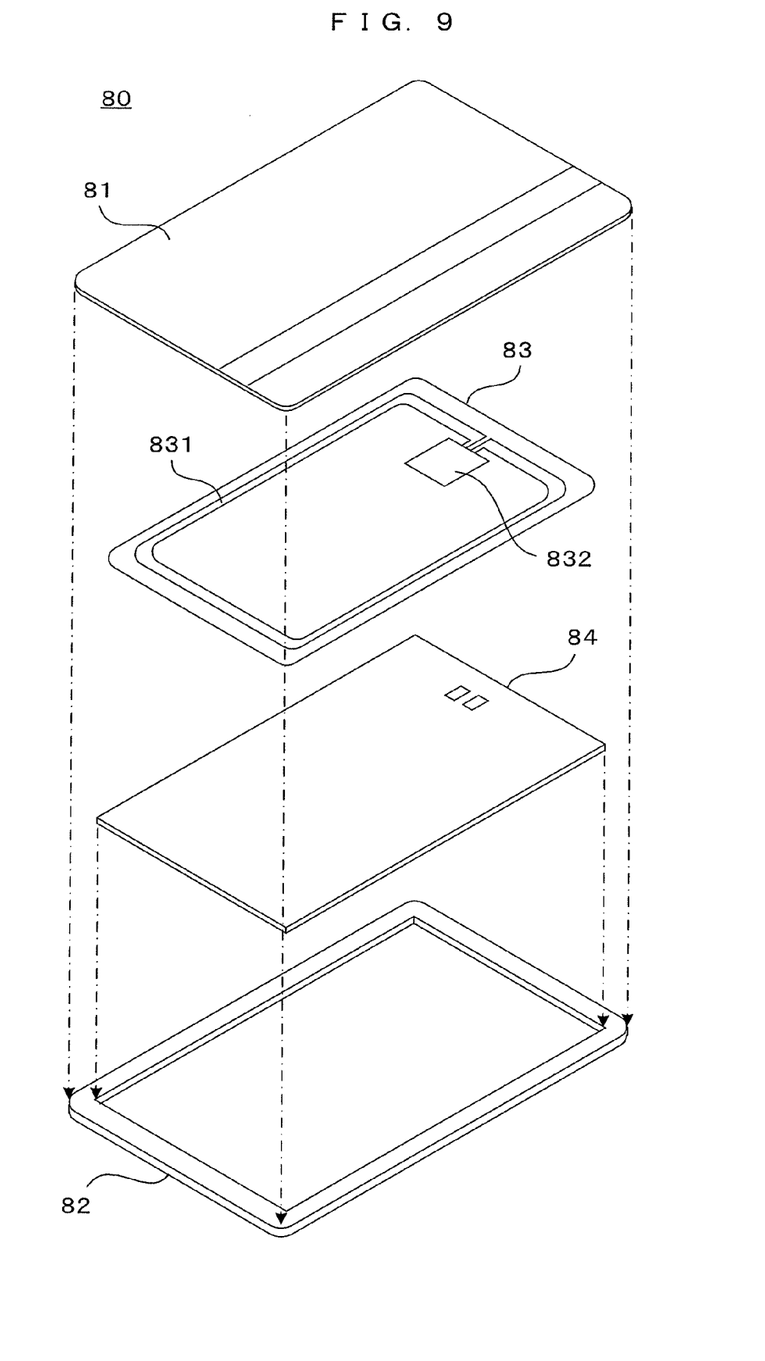
FIG. 9 is a drawing which diagrammatically shows an electronic device as another example of the device mounted with the battery according to the invention.

FIG. 9 is a drawing which diagrammatically shows an electronic device, specifically an IC card (smart card) as another example of the device mounted with the battery according to the invention. This IC card 80 includes a pair of housings 81, 82 which constitute a card type package by being fitted together, a circuit module 83 to be housed in these housings and a battery 84 which serves as a power supply for the circuit module 83. Out of these, the circuit module 83 includes a loop antenna 831 for external communication and a circuit block 832 with an integrated circuit (IC) for performing data exchange with external devices via the antenna 831 and various calculation and storage processes. One set or a plurality of sets of lithium-ion secondary battery modules 1 described above may be used as the battery 84.

According to this construction, a communication distance with external devices can be more extended as compared with general IC cards including no power supply themselves and more complicated processes can be performed. Since the battery 84 according to the invention is small in size and thin and can ensure a high capacity, it can be suitably applied to such card type devices.

As described above, in this embodiment, the negative-electrode current collector 11 corresponds to a "base material" and a "first current collector layer" of the invention, the negative-electrode active material and the negative-electrode active material layer 12 respectively to a "first active material" and a "first active material layer" of the invention. The negative-electrode active material application liquid corresponds to a "first application liquid" of the invention. The electrolyte application liquid corresponds to a "second application liquid" of the invention. The positive-electrode current collector 15 corresponds to a "conductive film" and a "second current collector layer" of the invention, and the positive-electrode active material and the positive-electrode active material layer 14 respectively to a "second active material" and a "second active material layer" of the invention. The positive-electrode active material application liquid corresponds to a "third application liquid" of the invention.

In the battery manufacturing method (FIG. 2) according to this embodiment, Step S102 corresponds to a "first active material layer forming step" of the invention, whereas Steps S103 and S104 correspond to an "electrolyte layer forming step" of the invention. Steps S105, S106 and S107 respectively correspond to a "second active material layer forming step", a "laminating step" and a "heating step" of the invention.

Note that the invention is not limited to the above embodiment and various changes other than the above can be made without departing from the gist thereof. For example, the coating methods employed in the respective steps are not limited to the above ones and other coating methods may be employed provided that they serve the purposes of these steps. For example, in the above embodiment, the spin coating method is employed to form the solid electrolyte layer 13. However, the application liquid containing the polymer electrolyte may be applied by another method capable of forming a thin film in conformity with the unevenness on the application target surface such as a spray coating method.

For example, in the above embodiment, the application liquid is dried by being heated at a temperature lower than the glass-transition temperature of the electrolyte material after the application of the electrolyte application liquid. However, in this process, it is necessary to keep the temperature below the glass-transition temperature and heating is not an essential requirement. The application liquid needs not be completely dried at this point of time and it is sufficient that the viscosity of the application liquid is increased to such a degree that the application liquid does not flow due to gravity or the like. Thus, the solvent may be volatilized, for example, by decompression. If the application liquid originally has a high viscosity and low fluidity, it may be dried by being left to stand for a predetermined time at ambient temperature. Unless the temperature of the solid electrolyte layer itself rises to or above the glass-transition temperature, the laminated body may be placed in a higher temperature environment than the glass-transition temperature. Therefore, the electrolyte application liquid may be dried by leaving the laminated body to stand under a high temperature equal to or above the glass-transition temperature for a short time.

For example, in the above embodiment, temperatures at the time of drying and heating treatments are set based on the glass-transition temperature of the solid electrolyte material. However, a change point of the fluidity of the material with respect to temperature might be unclear such as in the case of a material obtained by mixing a plurality of materials. Even in this case, the technical concept of the invention can be realized by respectively determining treatment conditions according to characteristics of the materials. For example, the treatment conditions may be set to increase the viscosity of the material in a drying stage immediately after application and to decrease the viscosity of the material in the heating treatment performed later. Also for a material showing high fluidity at a temperature lower than the glass-transition temperature, it is possible to perform the drying and heating treatments in a mode corresponding to a change of the fluidity.

For example, in the above embodiment, the heating treatment is performed after the positive-electrode current collector 15 is laminated on the positive-electrode active material layer 14. However, it is sufficient to heat the solid electrolyte layer 13 to reduce the viscosity after the positive-electrode active material layer 14 is formed, wherefore the solid electrolyte layer 13 may be heated after the positive-electrode active material layer 14 is formed and before the positive-electrode current collector 15 is laminated. However, to improve adhesion of the positive-electrode active material layer 14 and the positive-electrode current collector 15, it is desirable to bond the positive-electrode current collector 15 before the positive-electrode active material application liquid is cured. In this respect, it is more preferable to perform heating after the positive-electrode current collector 15 is laminated as in this embodiment.

For example, in the above embodiment, the negative-electrode active material layer 12 has the line-and-space structure made up of a multitude of stripe-shaped pattern elements parallel to each other, but the coating pattern of the negative-electrode active material is not limited to this and any arbitrary pattern may be used provided that the surface area thereof is increased by providing an uneven structure on the surface. Further, the respective stripe-shaped pattern elements 121 may be connected to each other. For example, as described next, the entire surface of the negative-electrode current collector 11 may be covered by a negative-electrode active material layer with unevenness.

Figure 10A:
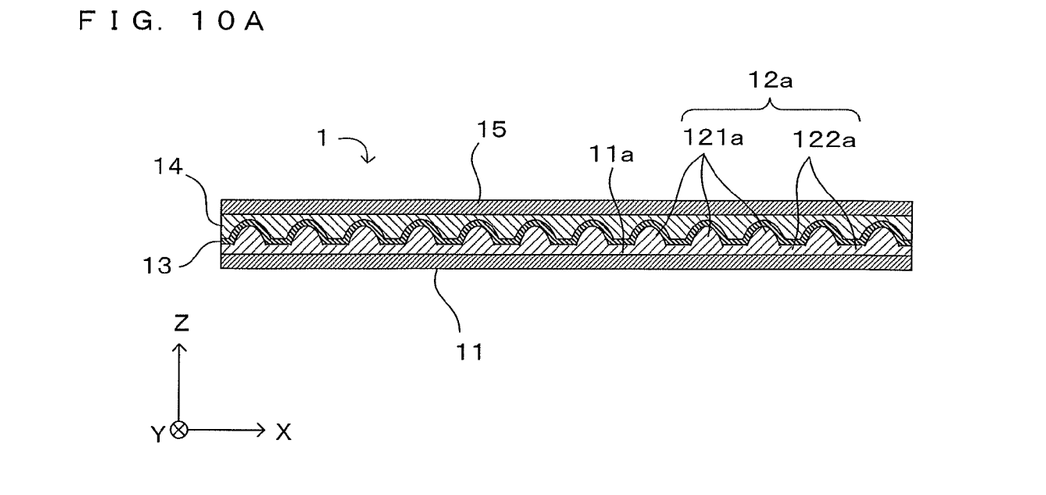
FIG. 10A is a diagram which shows a modification of the battery according to the invention.
Figure 10B:
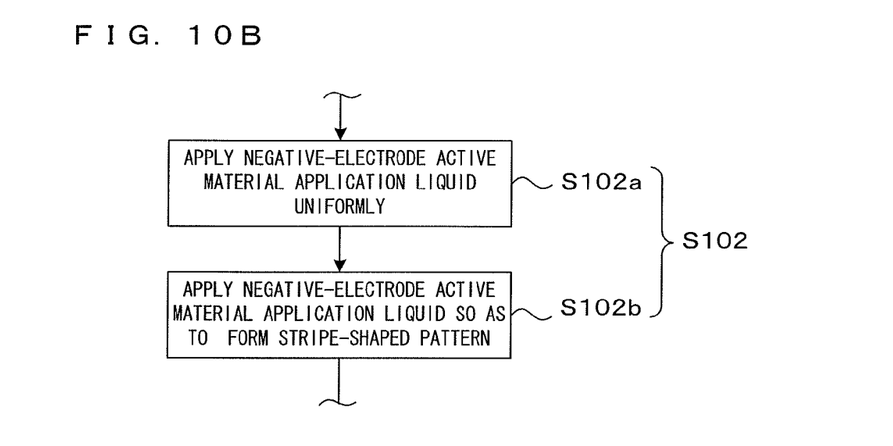
FIG. 10B is a drawing which shows a method for manufacturing this battery.

FIG. 10A is a diagram which shows a modification of the battery according to the invention, and FIG. 10B is a drawing which shows a method for manufacturing this battery. In the example shown in FIG. 10A, a negative-electrode active material layer 12a is formed by the nozzle-scan coating method as in the above and includes projected portions 121a formed by a negative-electrode active material and projecting upward (Z-direction) from a surface 11a of a negative-electrode current collector 11 and flat portions 122a covering the surface 11a of the negative-electrode current collector 11 located between the projecting portions 121a. In such a structure, the negative-electrode current collector 11 and a solid electrolyte layer 13 are not in direct contact and the negative-electrode active material is invariably present between them. Accordingly, contact areas increase between the negative-electrode current collector 11 and the negative-electrode active material layer 12a and between the negative-electrode active material layer 12a and the solid electrolyte layer 13, wherefore charge and discharge characteristics as a battery can be further improved.

In this example, the height of the projecting portions 121a of the negative-electrode active material layer 12a from the surface of the flat portions 122a of the negative-electrode active material layer 12a corresponds to the "height difference" of the of the unevenness on the negative-electrode active material layer 12a.

To obtain such a structure, Step S102 in the flow chart of FIG. 2 may be partly changed, for example, as shown in FIG. 10B. In Substep S102a of Step S102, a negative-electrode active material application liquid is thinly and uniformly applied on a surface of a copper foil as the negative-electrode current collector 11. Various coating methods capable of forming a film with a substantially uniform thickness can be employed as the coating method at this time. For example, the nozzle-scan coating method, knife coating method, doctor blade method, spin coating method, spray coating method and the like can be employed.

Subsequently, in Substep S102b, the negative-electrode active material application liquid is applied on a surface of the negative-electrode active material layer formed on the current collector 11 by the nozzle-scan coating method as in the above embodiment, thereby forming stripe-shaped pattern elements. In this case, a laminated body formed by laminating the flat negative-electrode active material layer on the current collector 11 corresponds to the "base material" of the invention. By this, the structure shown in FIG. 10A can be obtained.

A similar structure can be also formed by pouring the negative-electrode active material layer liquid between the pattern elements after the stripe-shaped pattern elements are formed on the surface of the negative-electrode current collector 11. In this case, there is no problem in applying the application liquid on the formed stripe-shaped pattern elements since they are of the same material. Further, the projecting portions 121a and the flat portions 122a may be formed by changing the thickness of the active material by changing the discharging amount of the application liquid from the nozzle depending on positions.

For example, in the above embodiment, the knife coating method is employed to form the positive-electrode active material layer 14, but another method may be employed provided that it is a coating method capable of finishing the positive-electrode active material layer 14 such that the lower surface in contact with the application target surface follows the unevenness on the application target surface and the upper surface is substantially flat. The viscosity of the application liquid is desirably not too high to accomplish such an object. However, if the viscosity of the application liquid is appropriately selected, even another coating method can finish the positive-electrode active material layer such that the lower surface is uneven and the upper surface is substantially flat. For example, the application liquid may be poured into recessed portions of the unevenness on the application target surface by the nozzle-scan coating method.

In the above embodiment, the negative-electrode active material layer, the solid electrolyte layer, the positive-electrode active material layer and the positive-electrode current collector are successively laminated on the negative-electrode current collector. However, contrary to this, the positive-electrode active material layer, the solid electrolyte layer, the negative-electrode active material layer and the negative-electrode current collector may be laminated in this order on the positive-electrode current collector.

The materials such as the current collectors, the active materials and the electrolyte illustrated in the above embodiment are merely examples and there is no limitation to these. Also in the case of manufacturing a lithium-ion battery using other materials used as constituent materials for lithium-ion batteries, the manufacturing method of the invention can be suitably employed. The invention is also applicable to production of chemical batteries (all-solid-state batteries) in general using other materials without being limited to lithium-ion batteries.

In the invention, in the case of using a polymer electrolyte as the solid electrolyte, it is meaningful to perform the heating step after application also in the sense of promoting a polymerization reaction of the electrolyte material. Accordingly, the degree of polymerization may be low when the electrolyte layer forming step is finished and a precursor of the polymer electrolyte material may be used as the electrolyte material to be contained in the application liquid.

In the heating step in the invention, the solid electrolyte material may be heated to a temperature equal to or higher than the glass-transition temperature. If the solid electrolyte material is heated to or above the glass-transition temperature, the viscosity of the solid electrolyte material suddenly decreases to increase fluidity, wherefore the electrolyte material can penetrate even into recessed portions of the fine unevenness on the first and second active material layers.

On the other hand, in the electrolyte layer forming step of the invention, the electrolyte layer may be heated to a temperature lower than the glass-transition temperature of the solid electrolyte material after the second application liquid is applied. The liquid component of the second application liquid can be volatilized to increase the viscosity thereof by heating the second application liquid. However, if the second application liquid is heated to or above the glass-transition temperature, the viscosity decreases rather than increases and the electrolyte material flows out. In a state where the second active material layer is not yet formed, this flow out can be avoided by keeping the temperature of the solid electrolyte material below the glass-transition temperature.

In the first active material layer forming step of the invention, the first application liquid may be discharged to the surface of the base material from a nozzle relatively moving with respect to the base material. Such a coating technology by a so-called nozzle dispensing method has a proven track record in being able to apply an application liquid to a fine uneven pattern, and can be suitably employed for the application of the first application liquid in the invention. Since a thick pattern can be formed in a short time by this method, batteries can be manufactured with considerably higher productivity than the prior art employing the ink jet method.

In the second active material layer forming step of the invention, the third application liquid may be so applied that the surface opposite to the one in contact with the solid electrolyte layer becomes flat, and a laminating step of laminating a conductive film, which will become a current conductor, in a state where the third application liquid is not yet cured may be further provided. The surface of the second active material layer facing the first active material layer with the solid electrolyte layer sandwiched therebetween needs to conform to the unevenness on the surface of the solid electrolyte layer, whereas the surface opposite to this needs not be uneven. Adhesion with the conductive film, which will become the current collector, is improved by making this surface flat. Further, there is a wide selection of coating methods for the third application liquid and various coating methods can be employed. Therefore, an improvement in productivity and a reduction in manufacturing cost can be realized.

In the electrolyte layer forming step of the invention, the thickness of the solid electrolyte layer may be made smaller than the height difference of the unevenness on the first active material layer. To obtain a high-performance battery, it is desirable to arrange the first and second active material layers in a wide area and as close to each other as possible. Here, if the electrolyte layer is formed to be thick, the significance of the unevenness on the first active material layer to increase the facing area is eliminated and a distance between the first and second active material layers increases. Thus, the thickness of the electrolyte layer is desirably smaller than the height difference of the unevenness on the first active material layer.

This invention can be suitably applied to a technology for manufacturing an all-solid-state battery using a solid electrolyte such as a polymer electrolyte as an electrolyte and is particularly suitable for manufacturing a battery having a small size and good electrochemical properties with excellent productivity.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A battery manufacturing method, comprising:
a first active material layer forming step of forming a first active material layer on a surface of a base material by applying a first application liquid containing a first active material on the surface of the base material, the first active material layer having unevenness on a surface opposite to a surface in contact with the base material, by discharging the first application liquid from a nozzle relatively moving with respect to the base material, to form a stripe-shaped pattern having a plurality of lines of the first active material;
an electrolyte layer forming step of forming a solid electrolyte layer by applying a second application liquid which contains a solid electrolyte material on the surface of the first active material layer, and heating the second application liquid to a temperature lower than a glass-transition temperature of the solid electrolyte material for increasing viscosity of the second application liquid after the second application liquid is applied,
the electrolyte layer having unevenness in conformity with unevenness of the first active material layer on a surface opposite to a surface in contact with the first active material layer, and the thickness of the solid electrolyte layer being made smaller than a height of the unevenness on the surface of the first active material layer;
a second active material layer forming step of forming a second active material layer by applying a third application liquid containing a second active material on the surface of the solid electrolyte layer; and
a heating step of heating the solid electrolyte layer to a temperature equal to or higher than the glass-transition temperature of the solid electrolyte material to reduce the viscosity of the solid electrolyte layer and to increase fluidity of the solid electrolyte layer so that the solid electrolyte material fills up clearance between the first active material layer and the second active material layer after the second active material layer forming step.

2. The battery manufacturing method according to claim 1, wherein,
in the second active material layer forming step, the third application liquid is applied such that a surface opposite to the one in contact with the solid electrolyte layer becomes flat; and
further comprising:
a laminating step of laminating a conductive film, which will become a current collector, on the surface of the third application liquid in a state where the third application liquid is not yet cured.

3. The battery manufacturing method according to claim 1, wherein said plurality of lines of the first active material are arranged extending in a same direction and at regular intervals from each other.

* * * * *